(12) United States Patent
Brandsma et al.

(10) Patent No.: US 7,169,072 B2
(45) Date of Patent: Jan. 30, 2007

(54) METAL PUSH BELT AND OIL SPECIFICATION RELATED THERETO

(75) Inventors: Arjen Brandsma, Tilburg (NL); Mark Van Drogen, Tilburg (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 10/737,790

(22) Filed: Dec. 18, 2003

(65) Prior Publication Data

US 2004/0127319 A1   Jul. 1, 2004

Related U.S. Application Data

(62) Division of application No. 10/028,427, filed on Dec. 28, 2001, now Pat. No. 6,695,732.

(30) Foreign Application Priority Data

Dec. 28, 2000   (EP)   ................... 00204817

(51) Int. Cl.
F16G 1/22   (2006.01)
F15G 5/16   (2006.01)

(52) U.S. Cl. ...................... 474/242; 474/201

(58) Field of Classification Search ................ 474/240, 474/248, 201, 272, 237, 265, 91
See application file for complete search history.

(56) References Cited

U.S. PATENT DOCUMENTS

| | | | |
|---|---|---|---|
| 1,960,693 A * | 5/1934 | Bryant | ......................... 474/91 |
| 4,332,575 A | 6/1982 | Hendriks | |
| 4,498,892 A * | 2/1985 | Huntley | ..................... 474/242 |
| 4,610,648 A | 9/1986 | Miranti, Jr. | |
| 4,643,702 A | 2/1987 | Cuypers | |
| 4,826,473 A * | 5/1989 | Miyawaki | ................... 474/240 |
| 5,180,345 A | 1/1993 | Van der Zande | |
| 5,800,299 A * | 9/1998 | Lamers et al. | ................ 474/91 |
| 6,123,637 A * | 9/2000 | Yagasaki | ..................... 474/242 |
| 6,270,437 B1 | 8/2001 | Yoshida et al. | |
| 6,440,023 B2 * | 8/2002 | Kanehara et al. | ........... 474/242 |
| 6,464,606 B2 | 10/2002 | Brandsma et al. | |
| 6,629,904 B2 * | 10/2003 | Fujioka et al. | .............. 474/242 |

FOREIGN PATENT DOCUMENTS

| | | |
|---|---|---|
| EP | 0 468 770 | 1/1992 |
| EP | 0574085 A1 * | 12/1993 |
| EP | 0 909 907 | 4/1999 |
| EP | 0 931 959 | 7/1999 |

(Continued)

*Primary Examiner*—Marcus Charles
(74) *Attorney, Agent, or Firm*—Young & Thompson

(57) ABSTRACT

A composite driving belt provided with a carrier and a plurality of transverse elements assembled slidably thereon, the carrier including one or more bands, preferably composed of a plurality of endless metal bands disposed radially around each other, each element being provided with a radially outward directed carrier contact plane for contacting a radial inner contact plane of the carrier while in operation, wherein the contact plane of both the carrier and the element have a non profiled surface. In particular the roughness and shape of the relevant contacting faces of a belt are adapted to achieve a hydrodynamic lubricating condition, while the lubricating oil is defined to meet the requirements of an improved efficiency push belt.

18 Claims, 2 Drawing Sheets

FOREIGN PATENT DOCUMENTS

| | | | |
|---|---|---|---|
| EP | 0 997 670 | 5/2000 | |
| JP | 60-81537 A * | 5/1985 | ................ 474/242 |
| JP | 60-164068 * | 8/1985 | ................ 474/91 |
| JP | 61-140648 A * | 6/1986 | ................ 474/263 |
| JP | 61-160645 | 7/1986 | |
| JP | 02-138533 A * | 5/1990 | |
| WO | 97/25552 | 7/1997 | |

* cited by examiner

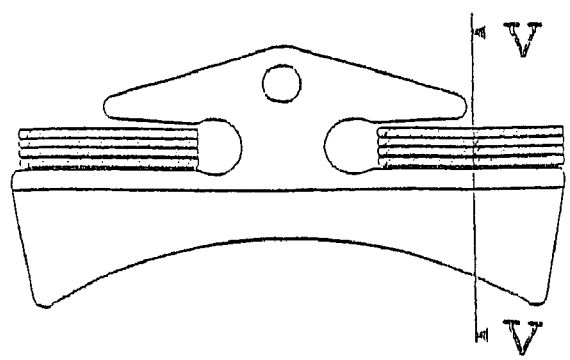
FIG. 4          FIG. 5
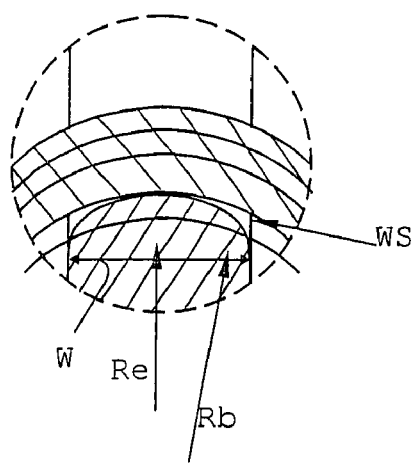
FIG. 6
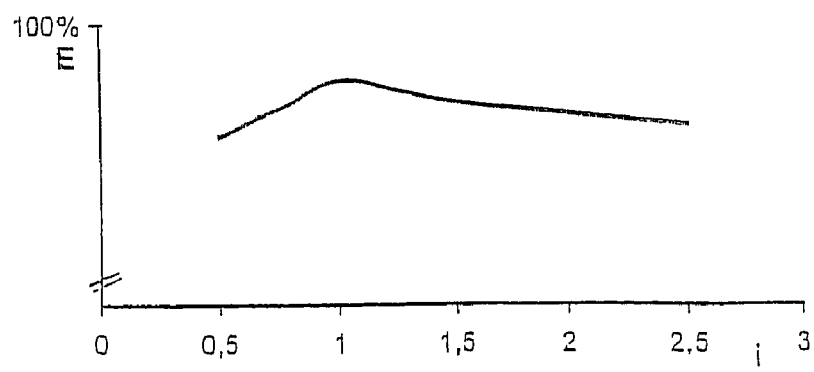
FIG. 7

METAL PUSH BELT AND OIL SPECIFICATION RELATED THERETO

CROSS REFERENCE TO RELATED APPLICATIONS

This application is a division of application Ser. No. 10/028,427, filed on Dec. 28, 2001 now U.S. Pat. No. 6,695,732, the entire contents of which are hereby incorporated by reference

BACKGROUND OF THE INVENTION

The invention relates to a composite driving belt provided with a carrier and a plurality of transverse elements assembled slidably thereon.

DESCRIPTION OF THE RELATED ART

Such Belt is generally known, e.g. described in U.S. Pat. Nos. 3,720,113 and 4,080,841. In the known belt, a carrier, alternatively denoted tensile element or tensile means, is composed as a package of a number of endless metal bands. The known belt may in particular be applied in a variable transmission, whereby the driving belt runs over pulleys, the substantial conical sheaves of which are adapted to be displaced axially relative to each other so that the running diameter of the driving belt over the pulley may vary. In turn, while the belt is in operation, the carrier or band package slides over a contact face, the so-called saddle part of the transverse elements. Also, the separate bands of the package slide relatively to each other during operation.

In practice the driving belt, in particular each of the bands, is under a very high tension, on the one hand to ensure a proper frictional contact between the pulleys and the transverse elements and on the other hand to properly conduct the transverse elements in the straight part of the driving belt, i.e. to prevent the belt, in particular the transverse elements in the straight trajectory part of the belt from splashing apart.

The efficiency of such Belt is rather high, but internal losses in the driving belt remain as result of frictional forces between the various parts, and as a result of such friction dissipated heat is to be removed. To meet these phenomena, the belt is in practice required to run in an oiled environment.

One manner of addressing these practical problems is addressed by European patent application 0014014, which shows a manner of draining oil to the locations where sliding contact may take place and where heat is to be removed. The main important contact areas dissipating heat are between pulley and transverse element, between saddle and tensile element and between the bands of the tensile element. According to the teaching of this publication, one flat side of each band should be profiled, such that when incorporated in a belt, this side abuts a band side without such profiling. In this manner an important oil drain is achieved by the profiling towards both sliding contacts in which a band is involved, viz. Mutually between the bands, and between the inner band of a carrier and the saddle of transverse elements.

The document thereby teaches that an improved mutual friction between the mutual bands disposed around each other leads to an efficiency increase.

From commercialised belts it is found that such profiling is applied on the inner side of such constituent metal rings of a band. This practice is also suggested by the figure of said EP publication and is confirmed by the recent patent publication EP-A-0909907.

A draw back of the known belts is that when the belt is operated in rotation transfer modes outside medium, i.e. outside ratio 1, the efficiency decreases, in particular when the belt is operated close to so called low (LOW) or over drive (OD) mode. It is an object of the current invention to address this phenomenon, i.e. to improve the efficiency in these areas in a safe and reliable manner, i.e. without endangering the proper oiling of the various sliding contacts related to the functioning of the known belt.

SUMMARY OF THE INVENTION

According to the invention this may in particular be reached by a construction in accordance with the features disclosed herein. A construction having the feature of the invention surprisingly directs away from above said common practice of contacting, realises an improved overall efficiency through a decreased amount of friction in the above said ranges, already by the mere omission of the oiling profile. Moreover, the measure according to the invention enhances the belt's lifetime by virtue of the effect that the decreased amount friction also occurs in the much-used parts of a transmissions range of ratios. Thus according to an insight partly underlying the invention, a distinction should be made between the shape of contact faces required in a band-band contact and in a band-element contact. The radial inward directed carrier surface is relatively very smooth, at least diminished by a half compared to the roughness from known belts, while a predetermined profiling is omitted from this surface, i.e. no separate aimed treatment of the profiling can be recognised in the surface.

BRIEF DESCRIPTION OF THE DRAWINGS

The invention will now be explained further by way of example along a drawing in which:

FIG. 4 represents a radial cross section of a belt, showing a transverse element and the tensile means cross section FIG. 5 is a cross section of the transverse element along the line V—V in FIG. 4, while FIG. 6 more in detail provides the cross section of the so-called saddle part in FIG. 5, alternatively denoted tensile means contacting face, in accordance with the invention.

FIG. 7, is a graph illustrating the efficiency characteristic of a belt in various drive ratios.

In the figures corresponding components are denoted by identical references.

DESCRIPTION OF THE PREFERRED EMBODIMENTS

Figure 1:
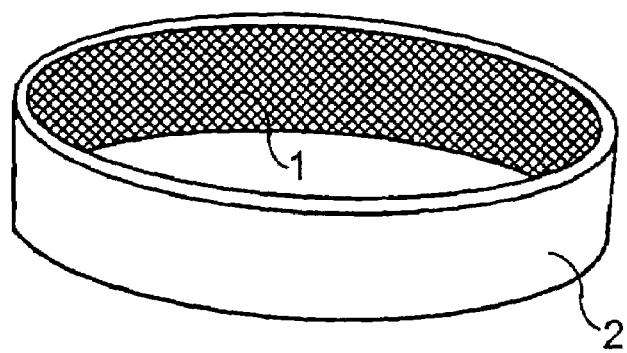
FIG. 1 represents a single ring of prior art belt.
Figure 2:
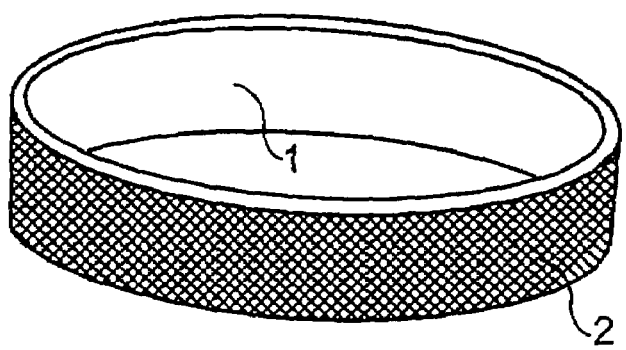
FIG. 2, in a view according to FIG. 1 represents a belt in accordance with the invention.

FIGS. 1 and 2 represent rings of a drive belt, in particular push belt as commonly known. The rings are in common applications like automotive personal vehicle and trucks, utilised in a nested arrangement of a plurality of circumscribing loops or rings, as may e.g. be taken from FIG. 4. Such a set of nested rings forms part or all of the belt's tensile means along which transverse elements are disposed freely moveable in the endless longitudinal direction of the belt. The elements are clamped between the sheaves of a set of pulleys and transmit rotation from one drive pulley to a driven pulley. The tensile means thereby serves to keep together the transverse elements pushing against each other.

When the driving belt runs over pulleys having different running diameters, the variable bands of the band package have a mutual speed difference, at least in situ of one of the pulleys. This speed difference may in practice be more than 1 meter per second between two successive bands disposed a round each other. Moreover, notably the inner bands of a carrier are pressed on to each other with substantial force, since the pressure force on a band is built up by all bands disposed outside i.e. there around.

By providing in particular the more inwardly disposed bands at least at one side with a surface profiling, through which an improved lubrication between the bands will be produced, an efficiency improvement occurs. Preferably, the surface profiling comprises grooves, which in practice provide good results. According to a further feature, the roughening value of the surface profiling lies between 0.30 and 0.75 µm Ra, here measured according to CLA method, and preferably between 0.46 end 0.55 µm Ra.

In a preferred embodiment provided in FIG. 2, the grooves are, like in the known belt, disposed in crossing sets, however at the radial outer side of the belt. A good result is achieved when the variable bands are provided with the surface profiling only at the outer one flat band side, while the radial inner side is provided relatively very smooth. The grooved profiling of the outer side of a metal band is achieved by rolling a band between rollers, one roller being fitted with a surface profiling on the circumferential surface.

The drawing in FIG. 1 diagrammatically shows an endless metal band. The width of such a hand may e.g. range between 5 and 20 mm and the thickness between 0.15 end 0.25 mm. The diameter of the band in circular condition may e.g. range between 150 and 400 mm. The endless band has an exterior side 2 and an interior side 1. In the known embodiment of FIG. 1, the interior side 1 is provided with a surface profiling of cross wise disposed grooves, whereas in the embodiment according to the invention this profiling is made to the exterior side 2 of a ring of a belt. In this manner, a band-element contact is made by the flat side of the ring. According to a preferred embodiment of the invention all rings of a belt's tensile means are incorporated in this manner.

It is further derived from the investigations underlying the current invention that contrary to the known manner of lubricating the contact between a carrier face and the saddles of the transverse elements a better performance is achieved alternatively at applying a combined set of measures. According to this set of measures, for lubrication of this contact should be relied on a natural flow of oil between element and carrier in combination with a very much smoothened surface area of both contacting faces, i.e. saddle face and the inner band facing of a carrier. However according to the invention, primarily, the smoothening, expressed in roughness index Ra, of both faces should be such that the so-called combined roughness Ra', i.e.

$$Ra'=SQRT(Ras^2+Rar^2) \quad (1)$$

where

Ra'=the reduced roughness index

Ras=the average roughness index of the saddle surface expressed in Ra.

Rar=the index for the average roughness of the inner ring face contacting the saddle.

SQRT=square root of ( . . . )

meets the requirement to remain smaller than 0.5 µm, preferably to remain within the area smaller than 0.25 µm.

Figure 3:
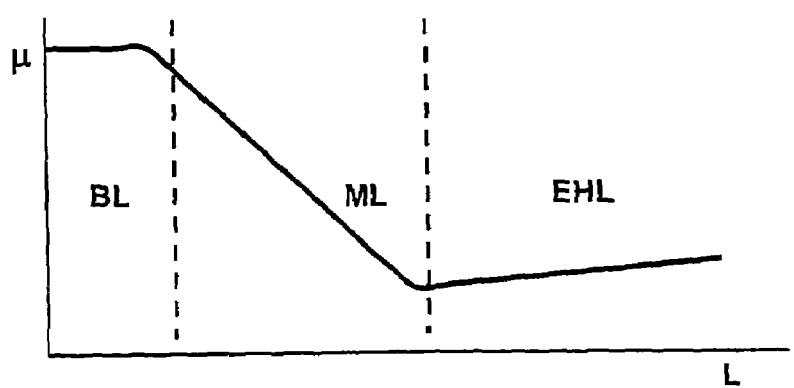
FIG. 3 is a tribological graph realised by research underlying the invention, and providing the insight upon which the invention is based.

FIG. 3 diagrammatically reflects a curved typical relation according to the invention between a friction coefficient or index, linearly indexed along the Y-axis of the figure, and a "belt and oil features" index L, alternatively Lubrication number L, logarithmically indexed along the X-axis. The index L is calculated utilising the formula:

$$L = \frac{\eta_0 V_r}{p_{av} R_a} \quad (2)$$

in which:

L=a lubrication number or index in accordance with an insight underlying the invention;

Vr=the relative speed between the two contacting surfaces, here of the inner belt ring and a transverse element's saddle;

$\eta_0$=the dynamic viscosity index of the lubricating medium;

Pav=the average Hertzian stress within the band/saddle contact;

Ra=the combined surface roughness Ra' of both saddle and ring surface.

The combined surface roughness' is alternatively denoted reduced roughness is calculated in the ordinary manner in the art provided above, expressed in roughness coefficient Ra'.

The principal characteristic of the curved relation given by formula 1 and FIG. 3 is according to the invention determined by dominant parameters Vr, and Ra, whereas the viscosity and the average Hertzian pressure parameters are in accordance with the insight according to the invention not, at least not directly related to design parameters of the belt. The formula (2) according to the invention more in particular reveals that relative speed Vr is the most dominant factor for influencing the friction coefficient since also Ra is given once the belt is set into operation.

FIG. 3 shows in accordance with experimental results of research underlying the invention and matching the index line of formula 1, that the relation between an actual friction coefficient and the lubrication index appears to typically follow a curve with three main sections. In the first section BL, suggestedly where so called boundary lubrication, i.e. shearing contact exists between the two contacting surfaces, the friction coefficient is virtually constant with increasing index L. In a second section ML, suggestedly where mixed lubrication and friction occurs, the friction coefficient drops with increasing L number, typically from somewhere like 0.18 to somewhere like 0.01. In the third section HL, where suggestedly hydrodynamic lubrication exists, i.e. with shear occurring within the lubricant and not between the contacting surfaces, the actual friction index has it's lowest value and again is virtually constant or may slightly increase again with increasing value of L.

FIG. 7 diagrammatically shows the efficiency curve of a known belt. It reveals that efficiency is lowest towards the extreme ends of a typical ratio range, i.e. between overdrive ratio area OD to the left of the graph and low drive ratios area LOW to the right of the graph. In the exemplary graph typical values for ratio i at LOW are around i=2.4 while at OD area ratio i is around i=0.5. Highest efficiency occurs in Medium ratio with i=1. With the measure in accordance with the invention, i.e. with fully smooth contacting faces of preferably low roughness contacting each other, the efficiency of the belt is increased by an amount within the higher part within the range between 0.25 and 1% of efficiency increase, whereas the extreme ends of the ratio range show an increase of values within the lower part of the range. The overall increase in efficiency is of considerable significance at long life operation of the belt.

The efficiency increase achieved by the primary, abovementioned measure is in accordance with a further, separate though here combined measure according to the invention achieved by a specific shaping of the transverse elements saddle. This measure in particular, i.e. mostly effects the belt efficiency towards the LOW and OD sides of the ratio range. The measure is illustrated by the drawing in FIG. 7, described in the following.

FIG. 4 provides a cross section of a belt and a view of a transverse element known per se, depicted according to a view in the longitudinal direction of the belt. FIG. 5 is a transverse cross section thereof over the line V—V, with the tensile means being omitted from the drawing, providing a view in a belt's axial direction. FIG. 6 in an enlarged scale depicts the in FIG. 5 encircled part of the element, in fact the part which contacts the inner face of a belts tensile means, the so called saddle of an element, here shaped in accordance with the invention. In FIG. 6 the tensile means is shown.

In the saddle according to the invention the contacting face is shaped so as to realise both a line shaped contact between tensile means and saddle and a wedge shaped space (WS) between the relevant contacting element and the portion of the tensile means extending over the relevant element. According to the invention, in this manner lubricating medium, at normal operation applied constantly to the belt, may be collected in a manner so as to have a concentration at a point, i.e. an axial line of contact between the tensile means and the saddle. With this concentration of lubricating medium, sufficient amount of medium is ensured for realising the conditions to achieve a so-called Hydrodynamic Lubrication in the contact between saddle and tensile means. The saddle is also shaped such so as to achieve the same condition also in cases where the relative movement between saddle and tensile means in the longitudinal direction, depending on the operating conditions of the belt, may temporarily be reversed. At achieving the said lubricated condition in the said mutual contact, use is made of the insight that the element and the tensile means each have a different effective radius of rotation within a pulley, so that relative difference Vr in velocity of each belt component occurs, thereby creating the possibility of having a lubricated contact. To achieve such condition, the saddle is in accordance with the invention, as taken in cross section, provided with an elliptical shape. In this manner, with respect to a lubricated contact, even at the circular trajectory with smallest radius of a belt within a transmission, a sufficient amount of wedge shaped spacing, the so called entry space, between the tensile means and the saddle is guaranteed before the mutual contact takes place.

It will be evident from the preceding description that it is a further prerequisite in accordance with the invention that for achieving the desired condition in the mutual contact, the local bending radius Rb of the band, i.e. tensile means, and of the saddle Rs may not be equal, thus:

$$Rb <> Rs \quad (4a)$$

while also $$Rs < Rb \quad (4b)$$

In accordance with a further aspect underlying the invention, the combined local radius, i.e. the reduced radius of both the saddle and the tensile means is taken into consideration by the requirement:

$$1/Rr = 1/Rs + 1/Rb \quad (5)$$

Where

Rr=the reduced radius of a Carrier and Saddle face contact

Rs=the local radius of the saddle measured in mm

Rb=the instantaneous radius of the band measured in mm

It is in accordance with the invention considered that for most applications of a belt, generally Rs should range up to 25 mm, whereas Rr for commonly applied transmissions typically ranges between 25 and 80 mm during operation of the Belt. Both the radii are taken in accordance with the radial and longitudinal direction of a belt, considering the normal operation and configuration thereof in a pulley. More in particular it is considered that for realising the said wedge shaped entry space at the largest amount of possible contacting locations on a saddle, as taken in longitudinal direction of the belt over the saddle surface, without the radii of saddle and band becoming equal, the saddle should according to the preferred embodiment be shaped elliptical, with the ellipse extending over virtually the entire thickness of an element, thereby obviating non-continuous transitions in a possible contacting surface since from experience underlying the invention it is known that these will break, i.e. remove the lubricated condition in the mutual contact. Thus, in dependence of an elements thickness, the saddle is shaped so as to at least largely, e.g. within 90% reliability, correspond to the shape of a half ellipse, the corresponding ellipse being defined by the mathematical formula for an ellipse and departing from the prerequisites in accordance with the insights underlying the invention according to which, the ellipse largest width corresponds to the elements width, while the derived local radius of curvature at the ellipse largest height should be smaller than the smallest possible radius of curvature of the belt. In this manner, also a continuous transition from the elements principal face to the saddle is achieved, i.e. by an infinitely small radius of curvature.

The invention particularly aims at realising a generally applicable design rule. Thus it is taken that for most applications a minimum element thickness will be 1.5 mm, while a smallest radius of curvature, either defined by the physical features of the belt or by the smallest diameter of transmission shafts over which the belt will run, will be about 25 mm. It is to be understood that in the latter respect the specification of the belt, i.e. the prescribed boundaries of use take precedence over the radius that a belt may actually presume due to it's physical characteristics. Thus in accordance with a preferred embodiment and design rule of the invention, a generally applicable shape is attained of which the largest diameter through the elliptical centre is 1.5 mm, the shortest diameter about 0.046 mm or smaller, while the local radius of curvature concurring with the line of the said shortest diameter is 25 mm or smaller, while the radius of curvature over the line concurring with the line of the said largest diameter, is 6.75 E-4 mm, i.e. infinitely small, thus obviating a non-continuous transition from an element principle plane to the saddle surface.

For even better performance of a belt and transmission in accordance with the invention the invention provides to apply an lubricating medium in the form of an oil type having a dynamic viscosity η larger or equal to 9 MPa*s at a nominal temperature of 100 degrees Celsius, preferably also having a kinematic viscosity v larger than or equal to 10 E-6 m²/s. In this manner all factors influencing the quality and efficiency of operation of a belt are optimised, more importantly, are brought into a functionally safe area.

In the latter respect, according to a further aspect of the invention, the so-called rocking edge of the belt is provided below 1 mm from the saddle surface, more in particular in a range between 1.25 and 2 mm below the saddle surface. In this manner it is achieved to increase the relative velocity Vr between saddle and tensile means, alternatively denoted carrier, in particular at the extreme OD and LOW ends of the range of ratios in which the belt will operate. In combination with any, preferably all of the previous measures this measure appears to increase the belts efficiency, in particular in these LOW and OD areas in which the belt may operate most of its operating time.

The invention further relates to all details of the figures pertaining to the description and all features defined in the following claims.

The invention claimed is:

1. A composite driving belt provided with a carrier and a plurality of transverse elements assembled slidably thereon, the carrier comprising one or more bands disposed radially around each other, each element being provided with a radially outward directed carrier contact plane for contacting a radial inner contact plane of said carrier while in operation, wherein, the carrier contact plane of the element, as seen in side elevation, is provided over a major part of a width of the element and is provided with a convex curvature for contacting the carrier inner contact plane, the convex curvature defined by at least substantially corresponding to the shape of a non-circular half ellipse, the corresponding ellipse being defined by the mathematical formula for an ellipse in which the ellipse's largest width corresponds to the width of the element and the local radius of curvature at the ellipse's largest height is smaller than the smallest radius of the curvature of the belt, the belt is constructed for operation in a lubricated environment with a lubricating medium collected between the carrier contact plane and the carrier during operation in all drive ratios of the belt, wherein, i) the carrier contact face of an element is shaped such that the contact between an element and the carrier, under all operating conditions in each drive ratio of the belt, defines a wedge shaped space between the carrier contact face of the element and the contact face of the carrier, and ii) said elliptical shape of the carrier contact plane defines the wedge shape to collect a lubricating medium between the carrier contact plane of the element and the carrier during operation in all drive ratios of the belt to provide a concentration of lubricant at an axial line of contact between the carrier and the element in which shearing occurs within the lubricant and no shearing occurs between any contacting surfaces of the element and carrier.

2. Belt according to claim 1, characterised in that the combined roughness Ra' of both the contact plane of the element is lower than 0.10 μm.

3. Belt according to claim 1, characterised in that the roughness of the inner contacting face of the carrier is of a value lower than 0.2 μm.

4. Belt according to claim 1, characterised in that the roughness of the inner contacting face of the carrier is of a value lower than 0.10 μm.

5. Belt according to claim 1, characterised in that the contacting face of the carrier, at least once having run for two hours in a most accelerating transmission ratio (OD) within a transmission for which the belt is designed, has a roughness equal to or lower than 0.05 μm.

6. Belt according to claim 4, characterised in that each contacting face, of the carrier and the element, has a roughness equal to or lower than 0.05 μm.

7. Belt according to claim 1, characterised in that the radius of curvature at the elements cross centre is smaller than the smallest radius of curvature allowed for the belt.

8. Belt according to claim 1, characterised in that the curvature extends entirely over said element contact face as seen in side elevation.

9. Belt according to claim 1, characterised in that the maximum height of the saddle is smaller than 0.025 mm.

10. Belt according to claim 1, wherein the bands have a predetermined surface profiling, and the roughness value of the surface profiling ranges between 0.30 and 0.75 μm Ra.

11. Belt according to claim 10, characterised in that the surface profiling is realised by grooves disposed in crossing sets.

12. Belt according to claim 1, characterised in that a rocking edge of each transverse element is set more than 1 mm below the saddle surface.

13. Belt according to claim 11, characterised in that a rocking edge is located in a range between 1.25 and 2 mm below the saddle surface.

14. Transmission provided with a belt according to claim 1, wherein the lubricated conditions provided by a lubricating oil are characterised in that the lubricating oil has a dynamic viscosity η larger or equal to 7 MPa*s, at a nominal temperature of 100 degrees Celsius.

15. Transmission provided with a belt according to claim 1, wherein the lubricated conditions provided by a lubricating oil, characterised in that the lubricating oil has a dynamic viscosity η larger or equal to 8 MPa*s, at a nominal temperature of 100 degrees Celsius.

16. The belt of claim 1, wherein the contact plane of both the carrier and the element have a relatively smooth surface.

17. A composite driving belt, comprising:

a carrier comprising plural bands disposed radially around each other; and a plurality of transverse elements assembled slidably on the carrier, each element being provided with a radially outward directed carrier contact plane for contacting, while in operation, a radial inner contact face of said carrier, each element having an element width, wherein, said radially outward directed carrier contact plane, as seen in side elevation, extends over a major part of the element width, said radially outward directed carrier contact plane has a convex curvature for contacting said carrier inner contact face, the convex curvature at least substantially corresponding to a shape of a non-circular half ellipse, the corresponding non-circular ellipse being defined by a mathematical formula for an ellipse in which the ellipse's largest width corresponds to the element width and a local radius of curvature at the ellipse's largest height is smaller than a smallest radius of the curvature of the belt, wherein, the belt is constructed for operation in a lubricated environment with a lubricating medium collected between the carrier contact plane and the carrier during operation in all the drive ratios of the belt, and the non-circular ellipse being shaped to collect the lubricating medium to create an elasto-hyrodynamic lubrication condition between the carrier contact plane and the carrier in all the drive ratios and to develop a layer of lubrication fluid between the carrier contact plane and the carrier with shearing occuring within the collected lubricant between the carrier contact plane and the carrier and no shearing occurring between contacting surfaces of the carrier contact plane and the carrier.

18. A composite driving belt, comprising:

a carrier with a band having a radial inner contact face; and plural transverse elements slidably mounted on said carrier, each element having a radially outward directed carrier contact face for contacting said carrier radial inner contact face, each element having an element width, said radially outward directed carrier contact face, as seen in side elevation, extending over a major part of said element width, said radially outward directed carrier contact face having a convex curvature for contacting said carrier inner contact face, the convex curvature corresponding to a shape of a non-circular half ellipse, wherein, the belt is constructed for operation in a lubricated environment with a lubricating medium collected between the carrier contact plane and the carrier during operation in all drive ratios of the belt, the carrier contact face of an element is shaped such that contact between each element and the carrier, under all operating conditions in any drive ratio of the belt, defines a wedge shaped space between the carrier contact face of each element and the contact face of the carrier, the wedge shape collects the lubricating medium between the carrier contact plane of the element and the carrier during operation in each drive ratio of the belt to have a concentration of collected lubricant at an axial line of contact between the carrier and the element in which shearing within a contact between the element and the carrier is only within the collected lubricant, and a non-circular ellipse, corresponding to the non-circular half ellipse shape of the convex curvature, is defined by a mathematical formula for an ellipse in which the ellipse's largest width corresponds to the element width and a local radius of curvature at the ellipse's largest height is smaller than a smallest radius of a curvature of the belt.

* * * * *